United States Patent [19]

Ichino

[11] Patent Number: 5,440,351
[45] Date of Patent: Aug. 8, 1995

[54] TELEVISION WITH USER-SELECTABLE RADIO SOUND

[76] Inventor: Ted Ichino, 7351 Artesia Blvd. #6, Buena Park, Calif. 90621

[21] Appl. No.: 68,620

[22] Filed: May 25, 1993

Related U.S. Application Data

[63] Continuation-in-part of Ser. No. 817,137, Jan. 6, 1992, abandoned.

[51] Int. Cl.⁶ .......................................... H04N 5/60
[52] U.S. Cl. ............................ 348/729; 348/738; 455/179.1
[58] Field of Search ............... 358/198, 184, 194.1, 358/165; 455/151.1, 174.1, 178.1, 179.1, 185.1, 180.2, 187.1, 79; H04N 5/46, 5/60; 381/3, 4, 107, 102, 104, 101; 312/7.2; 348/729, 738, 706

[56] References Cited

U.S. PATENT DOCUMENTS

| | | | |
|---|---|---|---|
| 266,502 | 10/1982 | Heijnen | D14/131 |
| 279,095 | 6/1985 | Kato et al. | D14/131 |
| 290,007 | 5/1987 | Mano et al. | D14/131 |
| 292,097 | 9/1987 | Akita et al. | D14/131 |
| 294,575 | 3/1988 | Okamoto | D14/131 |
| 296,552 | 7/1988 | Shindo | D14/131 |
| 298,534 | 11/1988 | Turner | D14/131 |
| 300,633 | 4/1989 | Makino et al. | D14/131 |
| 305,024 | 12/1989 | Nishiyori et al. | D14/131 |
| 2,617,878 | 11/1952 | Goldfus | 358/189 |
| 2,626,315 | 1/1953 | Farr | 358/189 |
| 4,272,788 | 6/1981 | Ogita | 381/3 |
| 4,527,204 | 7/1985 | Kozaki et al. | 358/194.1 |
| 4,627,101 | 2/1985 | Anderson et al. | 455/179.1 |
| 4,688,252 | 8/1987 | Kufta et al. | 381/4 |
| 4,779,129 | 10/1988 | Usee et al. | 358/189 |
| 5,046,107 | 9/1991 | Iwamatsu | 381/107 |
| 5,097,249 | 3/1992 | Yamamoto | 358/194.1 |
| 5,142,370 | 8/1992 | Wignot et al. | 358/189 |

FOREIGN PATENT DOCUMENTS

| | | | |
|---|---|---|---|
| 2831014 | 4/1980 | Germany | 358/189 |
| 0017017 | 2/1978 | Japan | 358/189 |
| 0045712 | 3/1982 | Japan | 358/189 |
| 0155885 | 9/1982 | Japan | 358/189 |
| 0033085 | 2/1986 | Japan | H04N 5/60 |

OTHER PUBLICATIONS

Middleton, Robert G., "Television Service Manual," 5th Edition, T. Audel, Indianapolis, Sep. 1984 p. 49 4.

*Primary Examiner*—James J. Groody
*Assistant Examiner*—Jeffrey S. Murrell

[57] ABSTRACT

A television set with an integrated radio tuner, such that simulcast radio broadcasts may be played through the television sound system at the viewer's discretion. A user-programmable memory provides the viewer with the ability to store multiple television channel/radio frequency associations. A remote control device provides the viewer with the capability of selecting either normal television audio or radio simulcast sound.

4 Claims, 7 Drawing Sheets

TELEVISION WITH USER-SELECTABLE RADIO SOUND

This is a Continuation-In-Part of Ser. No. 07/817,137, filed Jan. 6, 1992, now abandoned.

BACKGROUND—DESCRIPTION OF PRIOR ART

Heretofore, only FM radio simulcasts could be substituted for a normal television audio program; a viewer has not previously had the option of substituting an AM radio simulcast for a television audio program. Television audio engineers have traditionally seen radio simulcasts as merely stereo versions of the original television audio broadcast, and have either provided no simulcast capability or the ability to substitute FM radio simulcasts for the television audio program. The similarities between FM radio circuitry and television audio circuitry, which permit FM radio signals to be amplified through pre-existing television audio circuits, have reinforced this mindset. A number of inventions which allow an FM radio simulcast to be substituted for a normal television audio program exist in the prior art; however, none of these designs will accommodate AM radio simulcasts. By ignoring AM radio, these teachings exclude nearly all radio simulcasts, since the vast majority of all radio simulcasts are found on AM radio.

Portable units with both televisions and AM/FM radios have been produced, but the radio of these combination units has always been separate from the television of the unit; no provision to substitute radio sound for television audio has been provided. The radio and television of these combination units have been perceived as separate entities which happen to share a common housing.

It is well known in the prior art that television audio circuits can be used to amplify FM radio signals; indeed, Middleton teaches that television audio circuitry is quite similar to the circuitry of an FM radio. The prior art has made heavy use of this similarity. Wignot et al., U.S. Pat. No. 5,142,370 (1992); Uee et al., U.S. Pat. No. 4,779,129 (1988); Ogita, U.S. Pat. No. 4,272,788 (1981); and foreign patents Gorenje, DT 2831-014 (1980); Hitachi, 53-17017 (1978); Suzuki, 57-45712(A) (1982); and Saitou, 57-155885(A) (1982) all use television audio circuitry to amplify the radio signal. Wignot carries this circuit-sharing to its logical extreme, disclosing a way to make a television audio circuit function efficiently as an FM radio receiver.

Every instance of applicable prior art known to the applicant has either ignored the potential synergy between radio simulcasts and television sets, or else limited itself solely to FM radio simulcasts by routing the radio signal through television circuitry to be amplified. Television audio circuits cannot be shared with an AM radio; the intermediate frequencies of the two signals are too dissimilar. Besides excluding AM radio simulcasts, the prior art has the additional disadvantage of depending on a particular television broadcast format. It is unlikely that Saitou's device will work in conjunction with an HDTV television set: Saitou, along with the entire body of applicable prior art, relies on a fortuitous similarity between television audio circuitry and FM radio that has little chance of surviving the transition from analog to digital television.

Kozokai et al., U.S. Pat. No. 4,527,204 (1985) discloses a remote control device which facilitates the synergy between a video cassette recorder and a television set. Kozokai's remote control device cannot be compared with the remote control device of this invention. Kozokai's remote control device merely simplifies the interactions of two already interdependent video media, rather than establishing new interactions between two dissimilar and non-interdependent media. Kozokai's remote control device automates the steps necessary to display a VCR signal through a television set; it performs only mandatory actions. In contrast, a switch on a remote control device which causes radio sound to be substituted for television audio creates an interaction between two different media; a new relationship between the two media. This switch is not essential to the operation of a normal television. It is only useful when a receiver capable of decoding AM radio transmissions is incorporated into a television set, at which time it provides the new and unexpected result of allowing the viewer to choose between the normal television audio program and a radio simulcast at the touch of a button. This switch is neither obvious nor cost-effective if only FM radio simulcasts are considered. Because FM simulcasts differ from the original television audio program by being in stereo, and most television sets provide marginal stereo separation, there is no reason to provide such a switch for a television with FM-only simulcast capability. Even if the average television set had widely-separated speakers and excellent stereo separation, the scarcity of FM radio simulcasts would prevent such a switch from being cost-effective. The prior art recognizes this and provides circuits which automatically compare the strength of the FM simulcast signal against the strength of the television audio signal, automatically selecting the stronger of the two signals. The viewer is not burdened with a choice between television audio and FM simulcast sound, since the two are essentially identical.

Iwamatsu, U.S. Pat. No. 5,046,107 (1991) discloses a device which adjusts volume such that when the user switches among various audio sources, the volume remains constant. He describes a memory which stores preset volume levels and associates each preset volume level with a particular device. Like Kozokai, this device refines pre-existing relationships, rather than creating new attributes. In contrast, a memory which can associate a radio frequency with a given television channel and make this radio frequency available whenever the television is tuned to the channel creates a new attribute for the television channel. It creates a new relationship between the television channel and the radio frequency, with the new and unexpected result that the viewer has a choice between the standard television audio program and one or more radio simulcasts which describe the same event, but which differ in content among themselves and the original television audio broadcast.

The need of the non-English-speaking person to watch a television picture while listening to a simulcast in his or her native tongue has not heretofore been fully addressed. Second-language simulcasts are to be found on AM, not on FM radio. Television broadcasters have attempted to accommodate non-English-speaking persons by offering a Secondary Audio Program (SAP), but not all languages are covered; nor is SAP offered for every program; nor is SAP available on every broadcast channel. Radio simulcasts in a number of languages exist today; the prior art has ignored them by designing televisions which are either confined to receiving FM radio broadcasts or which cannot receive radio broadcasts at all. The present invention allows AM foreign-language simulcasts to be easily accessed, without impairing the viewer's ability to receive a television SAP audio broadcast.

Many sports fans would prefer to watch sports on television while listening to the play-by-play commentary from their local radio announcer, but desire the option to hear the normal television audio program when statistics are displayed or during interviews or replays. Again, these sports simulcasts are found on the AM radio band, not on FM radio. The present invention gives these sports fans the "best of both worlds"—they can listen to the radio announcer for the play-by-plays; switch to the television announcer for the replays, statistics, and interviews; and switch back to the radio announcer when play resumes.

The need of a viewer of alternate television formats, such as HDTV and cable, to access AM simulcasts has not heretofore been addressed. By keeping the interdependency between the host television and the AM radio to a minimum, the present invention will work with a wide variety of television sets. All that is required is a television which eventually separates the Audio signal from the Video signal and sends this Audio signal to the speaker system to be reproduced.

OBJECTS AND ADVANTAGES

Accordingly, one object and advantage of the invention is to provide the television viewer with a choice between listening to the regular television audio program and a radio simulcast. The viewer would be free to associate any television channel with any AM radio station, but would presumably select an appropriate radio station which is broadcasting an alternate audio program for the television program being watched.

Another object and advantage is to provide the television viewer with a choice between listening to a shortwave, CB, FM, AM, or another type of radio simulcast instead of listening to the normal television audio program. This invention has the potential to substitute virtually any kind of radio broadcast for a television audio program; it is not limited to AM simulcasts. The discussion below focusses on providing AM radio capability solely because this is where the vast majority of simulcasts are currently to be found.

Another object and advantage is to provide the viewer with a convenient means of storing frequently-used radio frequencies, and to provide a means of associating each of these frequencies with a television channel. This would give the user the ability to designate which radio station, if any, is an appropriate alternative audio source for a given television channel and to ensure that only this radio station would be available for the television channel.

Another object and advantage is to provide the viewer with a choice between listening to a radio simulcast and the audio program of an HDTV broadcast.

Another object and advantage is to provide the viewer with a choice between listening to a radio simulcast and the audio program of a cable television broadcast.

Another object and advantage is to provide the above features in a fashion which requires a minimum of skill and training to use.

An additional object and advantage is to provide a non-English-speaking person with a convenient way of listening to a radio simulcast in his native language while viewing the associated television picture.

Another object and advantage is to provide a sports fan with a convenient way of watching a sports event on television while listening to a radio simulcast of the same event.

Another object and advantage is to provide a method of quickly and easily switching back and forth between the television audio program and the radio simulcast.

Another object and advantage is to provide this ability to switch between the television audio program and the radio simulcast using a remote control device.

Readers will find further objects and advantages of the invention from a consideration of the ensuing description and the accompanying drawings.

BRIEF DESCRIPTION OF DRAWINGS

The invention will best be understood when the ensuing description is taken in conjunction with the accompanying drawings in which:

FIG. 7 is a front view of a TV screen with a special inset window which displays the radio frequency setting as it is entered by the user. The dotted rectangles are intended to show the location of the displayed digits of the radio frequency setting, and will not appear on the actual display.

FIG. 8 is a front view of a TV remote control device in accordance with the present invention.

The block diagrams have been drawn to illustrate the invention with maximum clarity, rather than to produce the most efficient device. For instance, in practice the television audio signal would probably not be separated from the video signal at the stage shown in the diagrams. Rather, it would most likely be allowed to go through several stages of amplification along with the video signal and would be separated at a much later stage than shown in the block diagrams, saving the cost of a couple of audio amplifiers. As another example, the means of switching between the normal television audio program and a radio simulcast is depicted as a button on a remote control device. In practice, this button could be a rocker switch, a slide switch, a toggle switch, a pushbutton with a different shape, or any type of switch capable of selecting a single audio source from two or more audio sources. There could even be two different buttons or switches which accomplish this selection: one which selects the normal television audio program when actuated, and one which selects the radio simulcast when actuated.

DETAILED DESCRIPTION OF THE DRAWINGS

Figure 1:
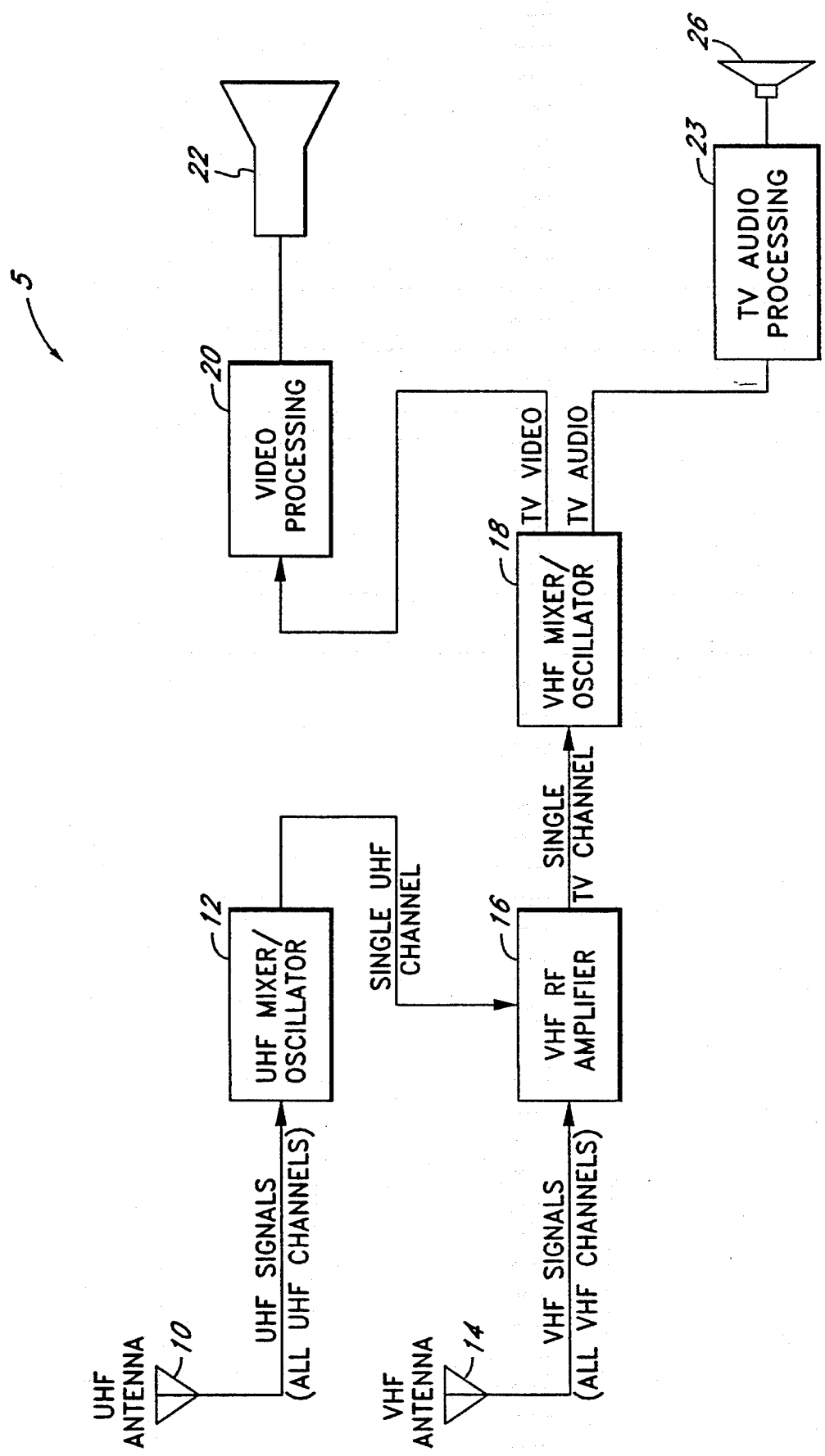
FIG. 1 is a block diagram of a television (TV) set showing the basic concepts of converting signals for audio/video processing as shown in prior art.

Referring to FIG. 1, a television set/apparatus 5 is broken into blocks to show the basic concepts of receiving incoming television signals and the video/audio processing entailed in converting these signals to a displayable form. The system includes UHF antenna 10 which receives incoming UHF signals and sends these signals to a UHF mixer/oscillator 12. Mixer/oscillator 12 contains a mixer to select a single television channel from the multitude of signals received, and radio frequency tuning circuits (not shown) to convert the chosen channel into an intermediate frequency. The resultant signal can be processed by the VHF circuitry, and thus is sent to the VHF RF amplifier 16.

Alternately, the VHF antenna 14 receives incoming VHF signals and sends these signals to to the VHF RF amplifier 16, which selects the desired frequency and rejects all others. In the VHF mixer/oscillator 18 this amplified signal is converted to an intermediate frequency. If the signal is a UHF IF from mixer/oscillator 12, the input UHF IF is amplified twice: once by the VHF RF amplifier 16, and again by the VHF mixer/oscillator 18.

Video processing 20 mainly amplifies and synchronizes the vertical and horizontal signals, and outputs them to the TV picture tube. Since this video processing is well known to the art, the system has been simplified and depicted as a block.

Figure 2:
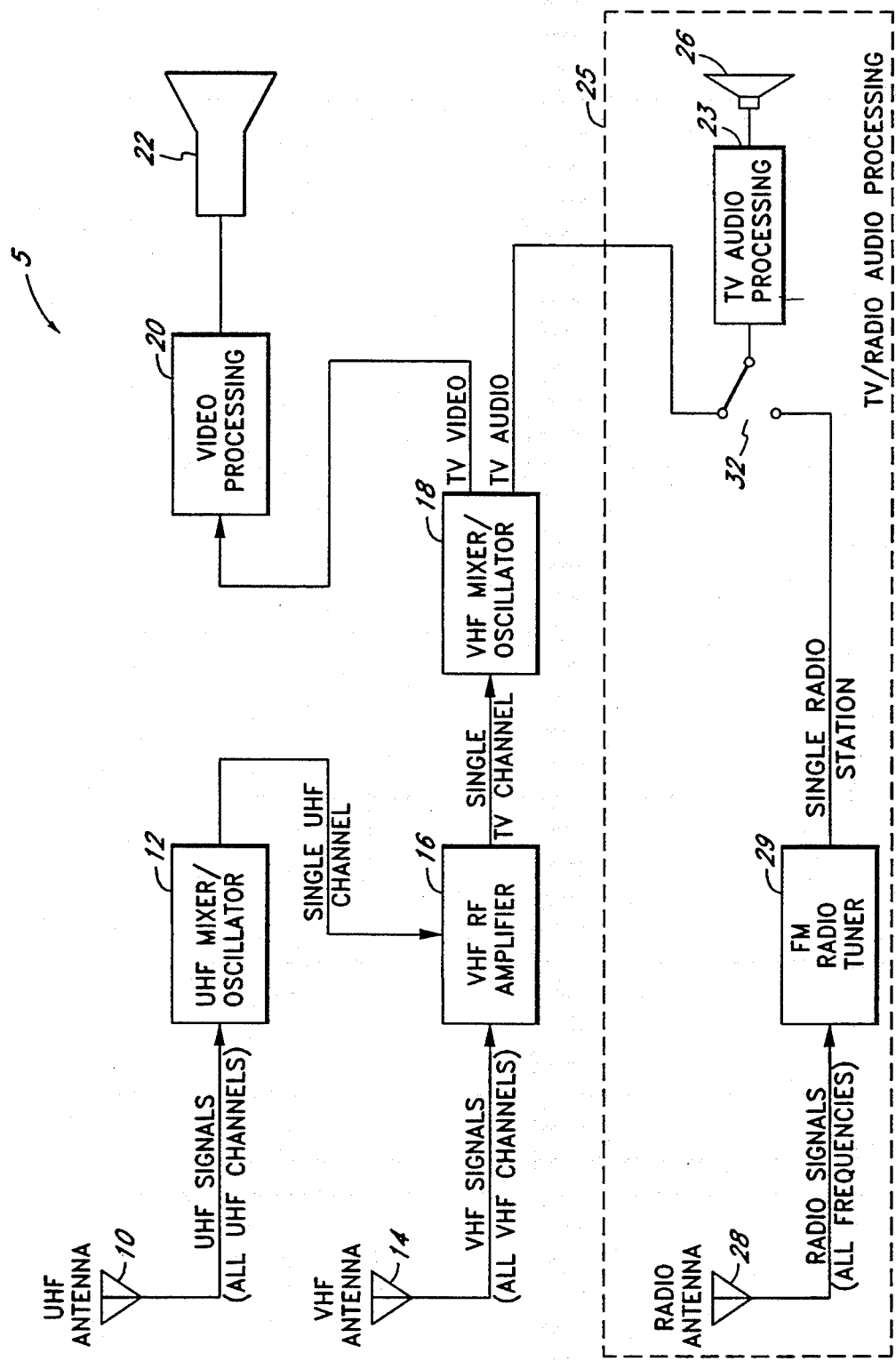
FIG. 2 is a block diagram of a TV set in conjunction with a radio tuner as shown in prior art.

As shown in FIG. 2, a radio antenna 28, an FM radio tuner 29, and a two-way switch 32 are added to television set 5. The FM radio tuner 29 selects the desired simulcast radio signal from the plurality of radio signals received by the radio antenna 28 and reconstructs the original audio signal. Since this process of selecting and demodulating a radio signal is well known to prior art, it has been simplified and depicted as a block. It is also well known that FM radio signals can be amplified using television audio circuitry; thus the signal is sent to Television Audio Processing for amplification. Switch 32 determines whether the television audio signal or the FM radio signal is amplified, picking the stronger of the two signals. The amplified signal is then sent to Television Sound System 26, to be heard by the viewer. For clarity, and to contrast the prior art with the present invention, the audio processing has been segregated into a single block, TV/Radio audio processing 25.

Figure 3:
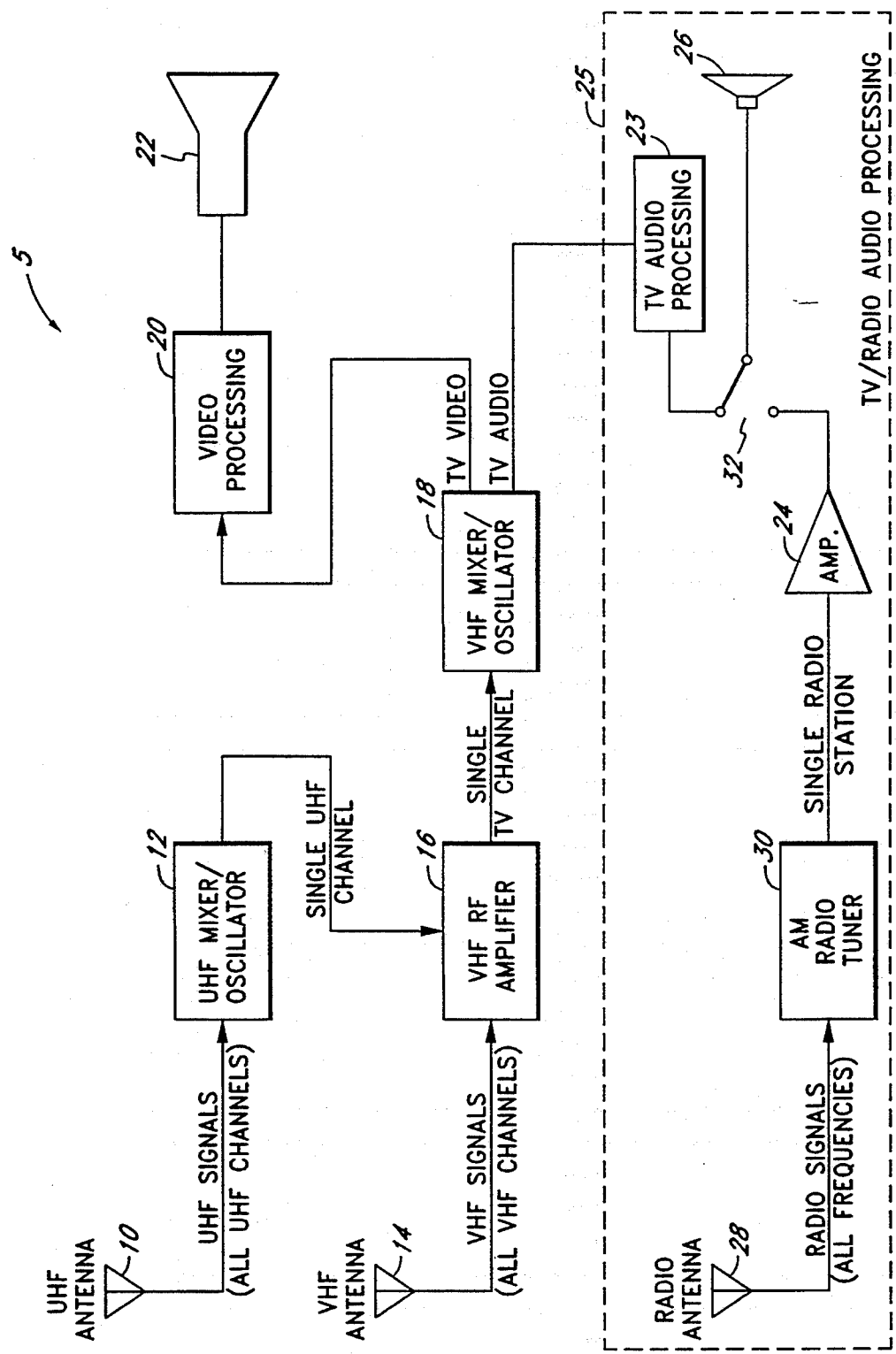
FIGS. 3, 5 and 7 are block diagrams of a TV apparatus in conjunction with a radio tuner in accordance with the present invention.

As shown in FIG. 3, radio antenna 28, AM radio tuner 30, and two-way switch 32 are added to television set 5. AM radio tuner 30 selects the desired simulcast radio signal from the plurality of radio signals received by radio antenna 28, and reconstructs the original audio signal. Since this process of selecting and demodulating a radio signal is well known to prior art, it has been simplified and depicted as a block. This simulcast radio signal is sent to AM radio signal amplifier 24 and then to Television Sound System 26 through switch 32. The television audio signal is independently amplified through Television Audio Processing 23 and sent to Television Sound System 26 through switch 32. For clarity, these two processes have been segregated into a single block, TV/Radio Audio Processing 25. Switch 32 ensures that only one of the two audio sources is active at any given time, and allows the viewer to change back and forth between the television audio program and the radio simulcast. Switch 32 can be actuated either manually or by actuating a switch on a remote control device. No changes need be made to Television Audio Processing 23; it can be completely normal and indistinguishable from the circuitry of a standard television set. This independence from Television Audio Processing allows the present invention to work with any television set which separates the television audio signal from the television video signal.

Figure 4:
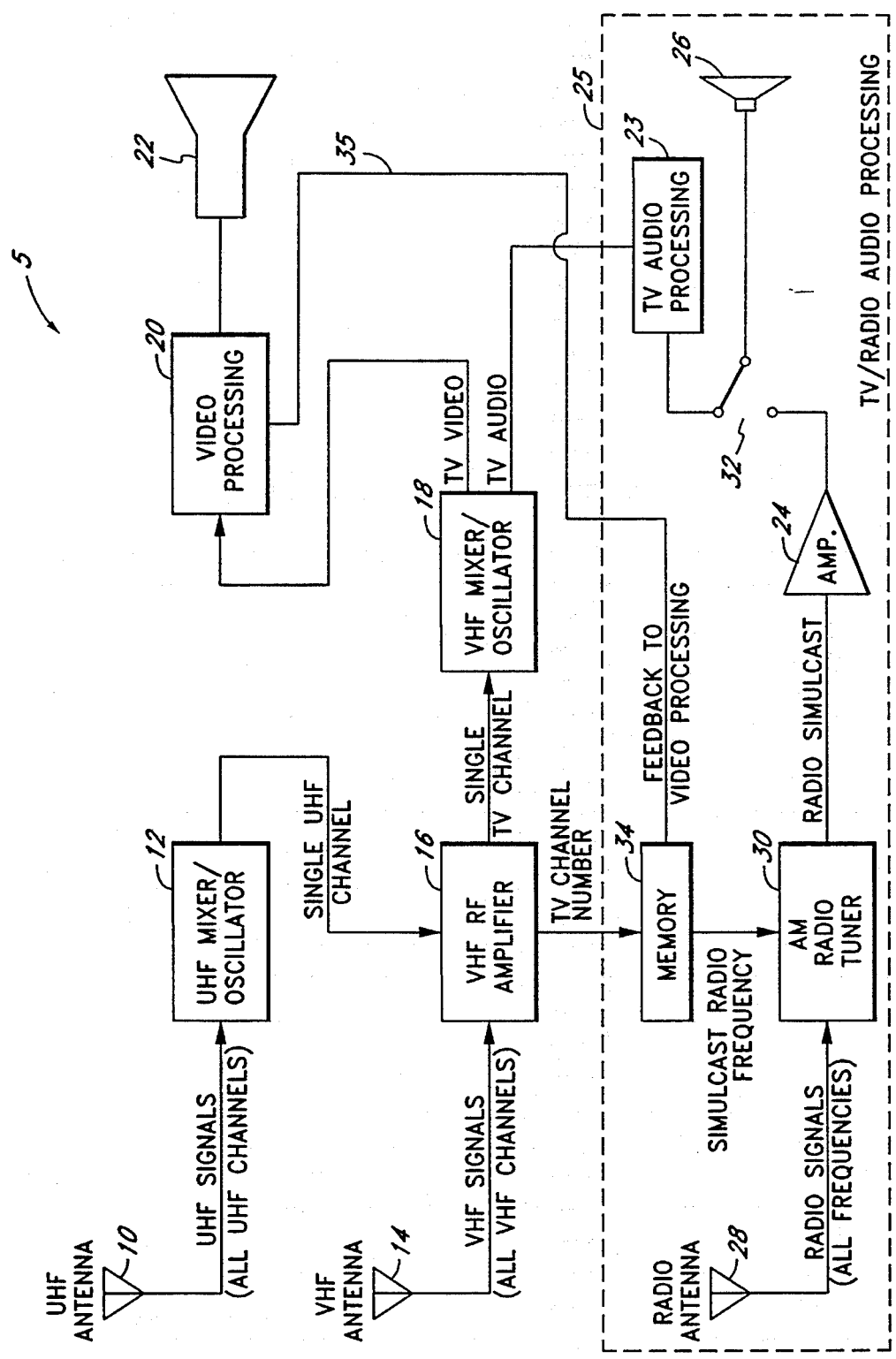
FIGS. 4, 6 and 8 are block diagrams of a TV apparatus in conjunction with both a radio tuner and a programmable memory in the preferred embodiment of the present invention.

FIG. 4 is the preferred embodiment of the present invention. Programmable memory 34, which correlates a given AM radio frequency with a given television channel, has been added to television set 5. As the viewer changes channels, memory 34 is checked, and if memory 34 contains an associated simulcast radio frequency corresponding to the current television channel, this simulcast radio program is automatically made available to the viewer (i.e., AM radio tuner 30 is automatically tuned to this associated radio frequency). If an associated simulcast frequency does exist for the television channel, it is briefly displayed in inset window 38 on television screen 36. Whether or not an associated simulcast frequency is available, memory 34 can be programmed by selecting an AM radio frequency, at which time this AM radio frequency and the currently-tuned television channel are stored as an association into memory 34.

Memory 34 can also optionally keep track of which of the two audio sources was last active on a given channel, and reactivate the same source when returning to the channel (e.g., if the viewer is watching Channel 14 while listening to a simulcast, and decides to change stations during a commercial break, when he/she returns to Channel 14 the simulcast, rather than the normal television audio, will be heard).

Figure 5:
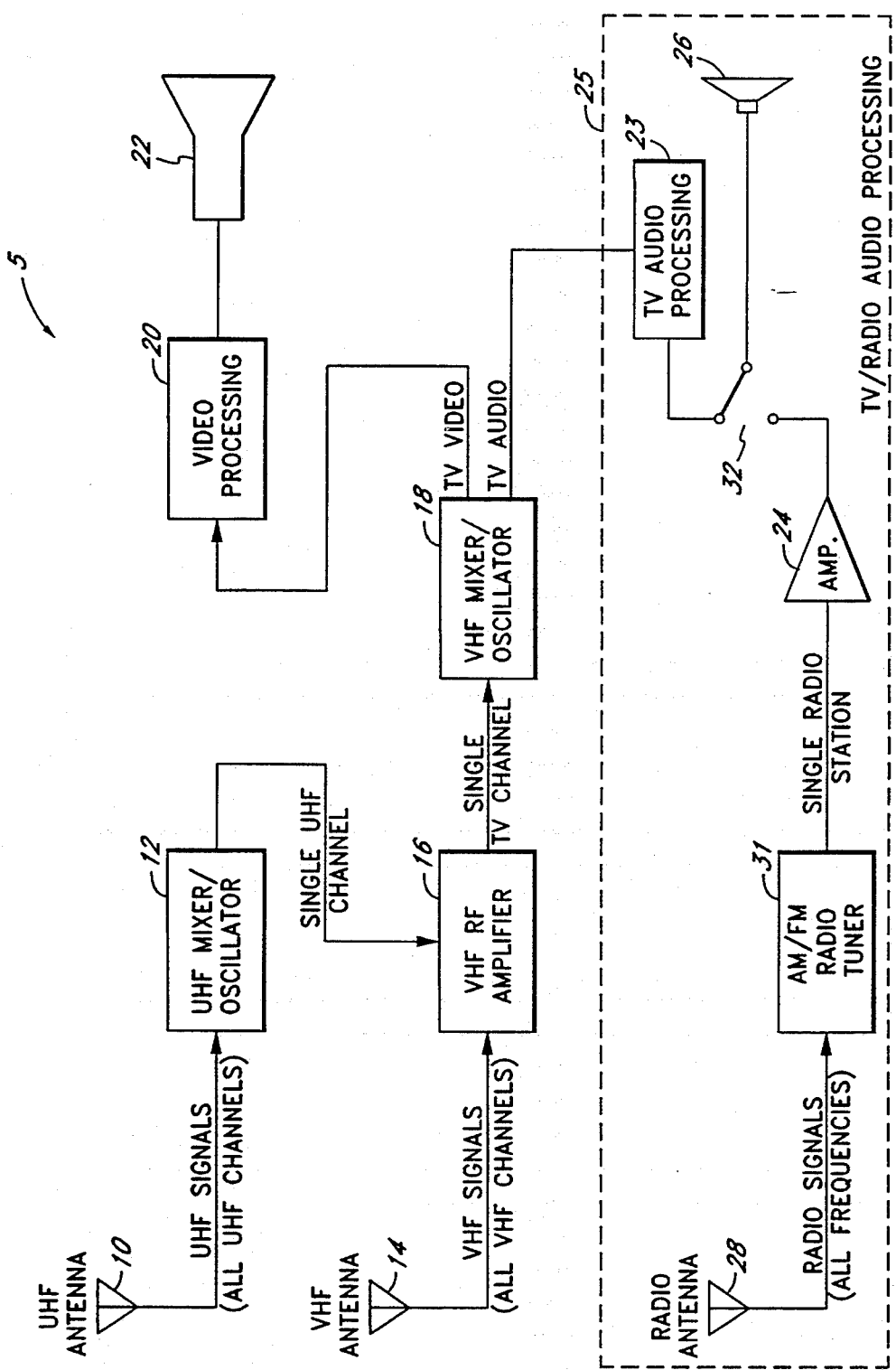
Figure 6:
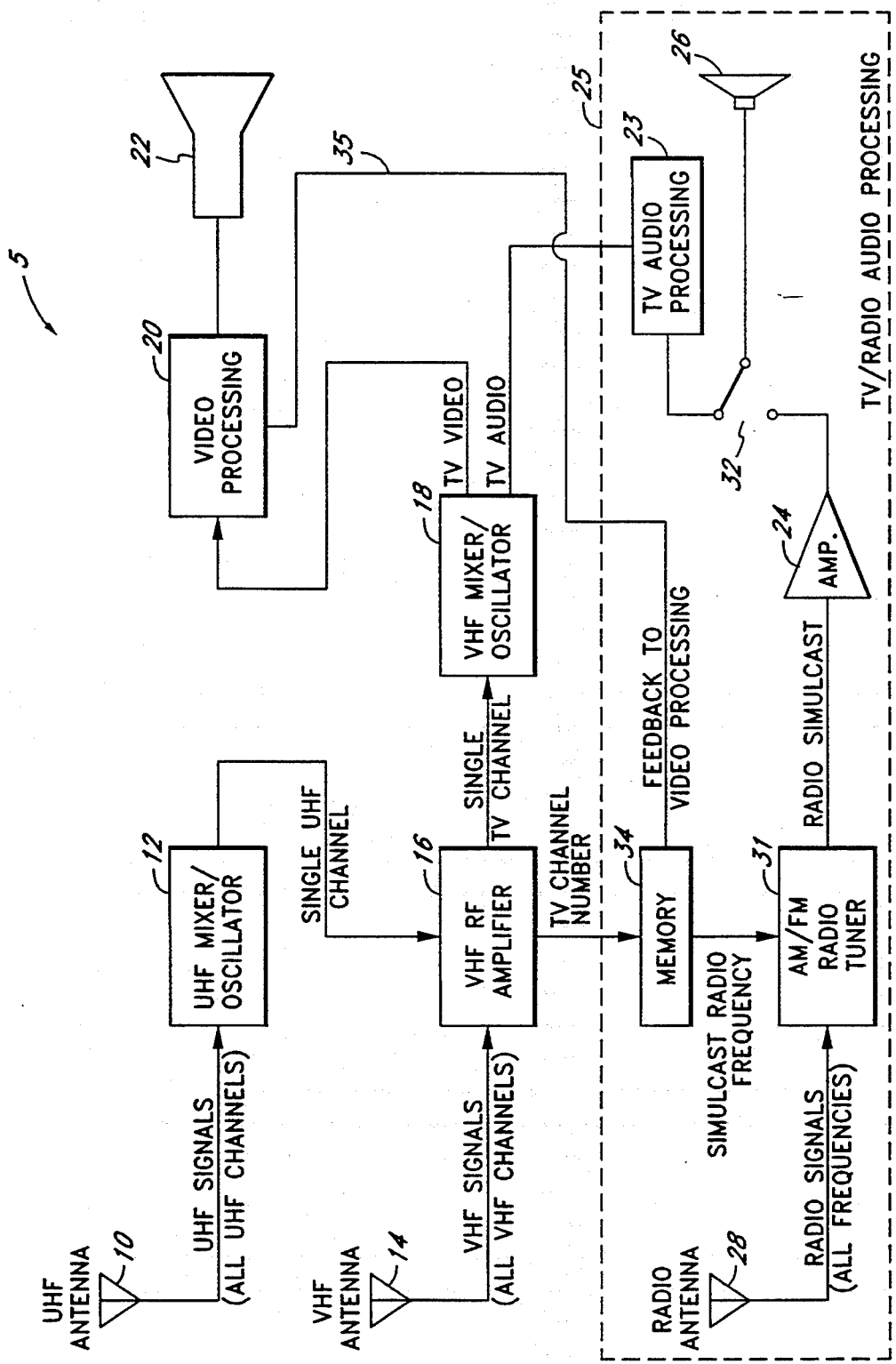

FIGS. 5 and 6 are modifications of the embodiments of FIGS. 3 and 4 respectively wherein different radio tuners are utilized.

Figure 7:
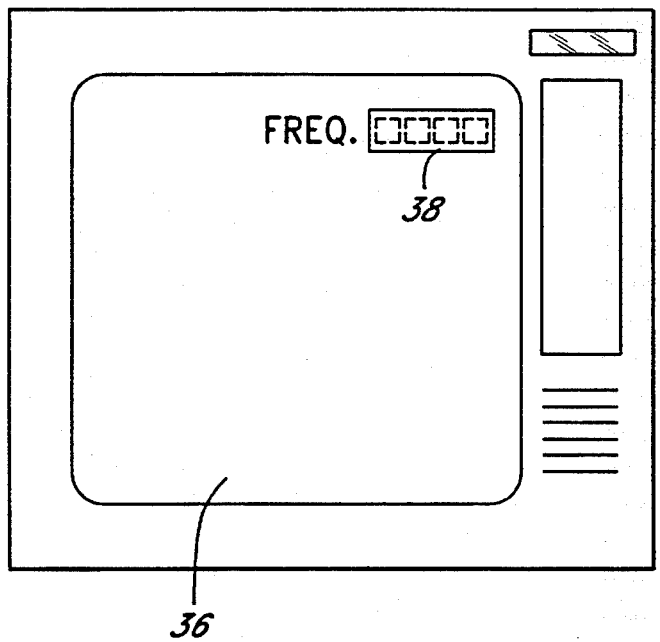

FIG. 7 shows sample television screen 36 with inset window 38 which appears when the viewer attempts to set AM radio tuner 30 of either FIG. 3 or FIG. 4 to a desired frequency. Inset window 38 can also appear when the television is tuned to channel for which an associated simulcast frequency exists. In the interests of economy and ease of operation, the display has been kept simple.

Figure 8:
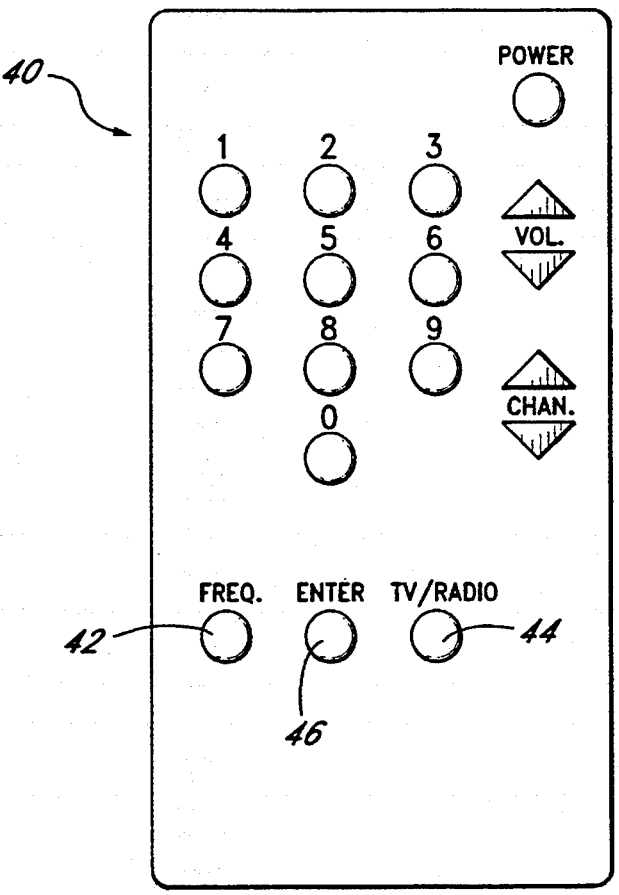

FIG. 8 shows remote control device 40, which can be used to program AM radio tuner 30 of FIG. 3, or AM radio tuner 30 and programmable memory 34 of FIG. 4. To program AM radio tuner 30, the viewer first presses Freq button 42 on remote control 40. Radio programming inset window 38 now appears on television screen 36, and the numeric keypad of remote control 40 now serves to program AM radio tuner 30 rather than to select a television channel. As the viewer punches in each digit of a radio frequency, the number is echoed to radio programming inset window 38. When the frequency is satisfactory, the viewer presses Enter button 46. In the device of FIG. 3, AM radio tuner 30 is now set to the selected frequency, the simulcast radio program is played through Television Sound System 26, the numeric keypad of remote control 40 is restored to its normal function of selecting television channels, and the television picture is restored to normal. In the device of FIG. 4, the same thing happens, with the additional effect of forming a correlation between the currently tuned television channel and the selected simulcast frequency, and entering this television channel/radio frequency association into programmable memory 34.

When Enter 46 button is pressed in the device of FIG. 4, memory 34 is checked to see if the television channel the set is currently tuned to already exists in memory 34. If so, the existing entry has its radio frequency field overwritten with the newly-entered radio frequency. If no entry for the current television channel is found, a new entry is created, consisting of the current television channel and the newly-entered radio frequency.

Pressing Enter button 46 also restores a normal television picture; window 38 displaying the selected radio frequency is eliminated. At the same time, the numeric keypad of remote control 40 is restored to normal operation; that is, pressing a button or buttons of the numeric keypad will now serve to select a television channel rather than to program a radio frequency.

TV/Radio button 44 on remote control 40 toggles back and forth between the radio simulcast and the normal television audio program. As mentioned previously, this does not have to be a button; it can be any one of a variety of switch types.

LIST OF REFERENCE NUMERALS

5. Television (TV) Set/Apparatus
10. Ultra-High Frequency (UHF) Antenna
12. UHF Mixer/UHF Oscillator
14. Very High Frequency (VHF) Antenna
16. VHF Radio Frequency (RF) Amplifier
18. VHF Mixer/VHF Oscillator
20. Video Processing Unit (provides sync and stability to the television picture)
22. Television Picture Tube
23. Television Audio System
24. Radio Signal Amplifier
25. TV/Radio Audio Processing
26. Television Sound System
28. Radio Antenna
29. FM Radio Tuner
30. AM Radio Tuner
31. AM/FM Radio Tuner
32. Switch
33. Non-FM Radio Tuner
34. Programmable Memory Unit
35. Feedback from Programmable Memory Unit
36. Television Screen
38. Inset Window for Programming and Displaying Radio Frequency
40. Remote Control Device
42. Button to Program Radio Frequency
44. Button to Toggle between Television Audio and Radio Simulcast
46. Button to tune the radio to the keyed-in frequency (FIG. 2) or to store the television channel/radio frequency entry in the Memory Unit (FIG. 3)

DESCRIPTION AND OPERATION OF INVENTION

FIG. 3 is the minimal embodiment of the invention, comprising a regular television with the addition of AM radio tuner 30, and switch 32 to enable the viewer to select between the television audio program and the radio broadcast. This embodiment would be relatively simple and inexpensive to implement. The television tuner and AM radio tuner 30 can be completely autonomous, and the radio broadcast could be available on either a single television channel, or on all channels. A single simulcast AM radio frequency is available at a time; there is no way to program multiple simulcast AM radio frequencies. Amplifier 24 is shown preceding switch 32 to divorce it from the television audio circuitry, allowing non-FM radio signals to be accommodated.

As previously described, FIG. 4 is the preferred embodiment of the invention. It differs from FIG. 3 by having programmable memory 34. Programmable memory 34 can store a single AM radio frequency along with a single associated television channel, and can optionally keep track of which audio source was last active on this channel. Programmable memory 34 has the capability to store a single television channel AM radio frequency association or a number of such associations. When the television is first turned on, the viewer will always receive the normal television audio program, regardless of the contents of programmable memory 34. If the viewer attempts to switch to an AM radio simulcast using TV/Radio button 44, memory 34 is searched to see if a radio frequency has been associated with the channel that television 5 is tuned to. If this television channel cannot be found in memory 34, no action is taken. If the channel is found in memory 34, the associated AM radio frequency is briefly displayed in inset window 38, AM radio tuner 30 is set to the associated radio frequency, and this AM radio simulcast is reproduced through Television Sound System 26. Pressing TV/Radio button 44 again will restore the normal television audio program.

FIG. 7 shows television inset window 38, which appears only when the viewer is programing AM radio tuner 30. Frequency selection is finalized by pressing Enter button 46, at which time inset window 38 disappears and a normal television screen is restored. For the device of FIG. 3, the programmed frequency is retained even when the television set is turned off, and becomes immediately available when the television set is turned back on. For the device of FIG. 4, the programmed frequency is entered into memory unit 34, along with the current television channel; additionally, AM radio tuner 30 is tuned to the selected radio frequency, and this simulcast radio program is reproduced through Television Sound System 26.

FIG. 8 shows remote control device 40, which can be used to program the unit of FIG. 3. Freq button 42 allows the viewer to key in a simulcast radio frequency, using the numbers on the keypad of remote control device 40. The viewer receives feedback by watching inset window 38, which appears when Freq button 42 is pressed, and which echoes the numbers punched in by the viewer. Pressing Enter 46 button tunes the radio to this selected frequency, restores a normal TV picture, and returns the numeric keypad of remote control device 40 to normal functioning.

For instance, to program AM 930, the viewer would press Freq button 42 and then press the "9", "3", and "0" keys on the numeric keypad of remote control 40. Pressing Enter 46 button would tune radio 30 to this frequency and play the radio simulcast through Television Sound System 26. Pressing Enter 46 button also restores television screen 36 to normal: inset window 38 of FIG. 4, which shows which numbers have been entered by the viewer, will disappear. Pressing Enter button 46 also restores the numeric keypad of remote control device 40 to normal functioning: the numeric keypad will now select TV channels rather than programming another radio frequency.

Pressing TV/Radio button 44 switches between the radio simulcast and the normal television audio program, and vice-versa.

Remote control device 40 of FIG. 8 can also be used to program memory unit 34 depicted in FIG. 4. The viewer first tunes the television to the desired channel; presses Freq button 42; keys in the simulcast radio frequency as described above; and finally presses Enter button 46 on remote control device 40. The difference between the two procedures is that the device of FIG. 4 must be tuned to the desired television channel prior to selecting a radio frequency, since this channel will be associated with the selected radio frequency and stored in memory unit 34 when the Enter button 46 is pressed.

TV/Radio button 44 switches between the television audio program and the radio simulcast, as described above.

When television set 5 is first turned on, the default sound on every channel is the normal television audio program. When the viewer presses TV/Radio button 44, memory 34 is searched, to see if it contains an entry for a television channel corresponding to the currently-active channel. If no such channel is found in memory 34, the normal television audio program will continue to play through Television Sound System 26. If a channel corresponding to the current television channel is found in memory 34, AM radio tuner 30 is set to the associated radio frequency, and this radio broadcast is reproduced through Television Sound System 26. Another press of TV/Radio button 44 returns the sound to the normal television audio program.

While the above description contains many specificities, these should not be construed as limitations on the scope of the invention, but rather as an exemplification of several embodiments thereof, one being the preferred embodiment. Many other variations are possible.

For example, switch 32 between the output from AM radio tuner 30 and the output from the television tuner could be eliminated by having two speakers—one for the television audio, and one for the radio—and an apparatus which ensured that only one of these sound sources was dominant at any given moment.

Another variation would be to include damping or muting circuitry to reduce the noise produced when switch 32 selects between television and radio sound.

Another variation would be to include an FM radio for stereo simulcast concerts in conjunction with AM radio tuner 30.

Another variation would be to substitute a CB radio, shortwave radio, or any other kind of radio for AM radio tuner 30.

Another variation would be to include a CB radio, shortwave radio, or any other kind of radio in conjunction with AM radio tuner 30.

Another variation would be to have AM radio tuner 30, and the variations on AM radio tuner 30 listed above, manually programmable, rather than remotely programmable as described in the Detailed Description of the Drawings.

Another variation would substitute a rocker switch, a toggle switch, or a slide switch for TV/RADIO switch 44.

Another variation would substitute any switch capable of selecting between or among a plurality of audio sources for TV/RADIO switch 44.

Another variation would break the functionality of TV/RADIO switch 44 into two separate switches; one which selects radio simulcast sound and defeats television audio when actuated, and one which selects television audio and defeats radio simulcast sound when actuated.

Another variation would substitute a different type of sound replication device, such as a plasma or an electrostatic screen or a metal ribbon, for the television speakers.

Yet another variation could vary the placement of buttons 42 44 and 46 on remote control device 40, or change the labels of buttons 42 44 46. Remote control device 40 could be redesigned to achieve the result of setting radio 30 to a desired frequency or of storing a television channel-radio frequency pair in memory 34 through different functions.

In another variation, Memory 34 could be either manually or remotely programmable. It could be programmed independently of AM Radio Tuner 30, or be programmed simultaneously with AM Radio Tuner 30, as described above in the Detailed Description of the Drawings. Memory 34 could be programmed independently of the currently-tuned television channel, or it could take advantage of the currently-tuned television channel as described above in the Detailed Description of the Drawings. Memory 34 could dispense with the feedback loop depicted in FIG. 4, setting AM radio Tuner 30 to an associated frequency without displaying this frequency in Inset Window 38.

In yet another variation, Memory 34 could create duplicate television channel/radio frequency associations instead of automatically overwriting an existing association. If duplicate associations are allowed, the viewer would be provided with a way to scroll through the simulcast radio frequencies associated with a given television channel, and a way to select the desired frequency.

In another variation, amplifier 24 could be moved to follow switch 32, with logic circuitry to determine whether or not the signal should be routed through amplifier 24.

In another variation, amplifier 24 could be moved to follow switch 32. Switch 32 would eliminate the need for logic circuitry by routing a signal from TV Audio Processing directly to Television Sound System 26, and routing a simulcast radio signal through a separate circuit which would send the simulcast radio signal through amplifier 24 after which it would proceed to Television Sound System 26.

In another variation, both amplifier 24 and TV Audio Processing 23 could be moved to follow switch 32. In this variation, amplifier 24 would lie on one circuit leading to Television Sound System 26; TV Audio Processing 23 would lie on separate circuit leading to Television Sound System 26; and switch 32 would make the appropriate connections. For instance, if normal television audio were selected, switch 32 would complete the circuit to Television Sound System 26 by routing the television audio signal through the circuit containing TV Audio Processing 23. If radio simulcast sound were selected, switch 32 would route the simulcast radio signal through the circuit containing amplifier 24, thus completing the circuit to Television Sound System 26.

Accordingly, the scope of the invention should be determined not by the embodiment(s) illustrated, but by the appended claims and their legal equivalents.

I claim:

1. A television apparatus comprising a television tuner means capable of selecting, from a plurality of TV signals representative of television program channels received, one of said TV signals; and further capable of separating the Video signal of the selected television channel from the Audio signal of the selected television channel; and still further capable, through Audio Processing means, of endowing said Audio signal with the capability of actuating a sound replication device;

an AM radio tuner means capable of selecting, from a plurality of AM radio signals received, one of said AM radio signals;

amplification means for amplifying the selected AM radio signal which is separate and independent from the Audio Processing of the television apparatus, and which endows said selected AM radio signal with the capability of actuating said sound replication device;

switching means for substituting said selected and amplified AM radio signal for the processed Audio signal of said selected television channel, whereby AM broadcasts can be substituted for the original television Audio program;

control means for controlling said switching means, whereby a user can choose to listen to a selected AM broadcast or the original television Audio program while watching the television picture.

2. The television apparatus of claim 1 with a nonvolatile electronic memory capable storing a television channel/AM radio frequency association and which, when the viewer specifies, retrieves the AM radio frequency associated with the currently active television channel and causes the radio to become tuned to this retrieved AM radio frequency, provided that a valid AM radio frequency has been previously associated with said currently active television channel, whereby the synergistic interaction between the AM radio and the television picture is facilitated by providing a means to quickly and easily tune a frequently-used radio frequency for a given television channel.

3. A television apparatus comprising a television tuner means capable of selecting, from a plurality of TV signals representative of television program channels received, one of said TV signals; and further capable of separating the Video signal of the selected television channel from the Audio signal of the selected television channel; and still further capable, through Audio Processing means, of endowing said Audio signal with the capability of actuating a sound replication device;

an AM/FM radio tuner means capable of selecting, from a plurality of AM and FM radio signal frequencies received, one of said frequencies from one of the AM and FM radio signals;

amplification means for amplifying the selected AM or FM radio signal which is separate and independent from the Audio Processing of the television apparatus, and which endows said selected AM or FM radio signal with the capability of actuating said sound replication device;

switching means for substituting said selected and amplified AM or FM radio signal for the processed Audio signal of said selected television channel, whereby selected AM or FM broadcasts can be substituted for the original television Audio program;

control means for controlling said switching means, whereby a user can choose to listen to a selected AM or FM radio broadcast or the original television Audio program while viewing the television picture.

4. The television apparatus of claim 3 with a nonvolatile electronic memory capable of associating a television channel with either an AM or an FM radio frequency and further capable of storing said television channel/radio frequency association and which, when the viewer specifies, retrieves the radio frequency associated with the currently active television channel, provided that a valid radio frequency has previously been associated with said currently active television channel, and which further causes the radio to be set to AM reception mode or FM reception mode as appropriate and which still further causes the radio to become tuned to said associated radio frequency, whereby the synergistic interaction between the AM/FM radio and the television picture is facilitated by providing a means to quickly and easily tune a frequently-used radio frequency for a given television channel.

* * * * *